US012591262B2

(12) United States Patent
Garvik

(10) Patent No.: US 12,591,262 B2
(45) Date of Patent: Mar. 31, 2026

(54) LOW POWER VOLTAGE REFERENCE

(71) Applicant: Nordic Semiconductor ASA, Trondheim (NO)

(72) Inventor: Harald Garvik, Trondheim (NO)

(73) Assignee: Nordic Semiconductor ASA, Trondheim (NO)

(*) Notice: Subject to any disclaimer, the term of this patent is extended or adjusted under 35 U.S.C. 154(b) by 194 days.

(21) Appl. No.: 18/289,350

(22) PCT Filed: May 5, 2022

(86) PCT No.: PCT/EP2022/062197
§ 371 (c)(1),
(2) Date: Nov. 2, 2023

(87) PCT Pub. No.: WO2022/234038
PCT Pub. Date: Nov. 10, 2022

(65) Prior Publication Data

US 2024/0243650 A1 Jul. 18, 2024

(30) Foreign Application Priority Data

May 5, 2021 (GB) ...................................... 2106421

(51) Int. Cl.
*G05F 3/24* (2006.01)
*G05F 3/26* (2006.01)

(52) U.S. Cl.
CPC .............. *G05F 3/242* (2013.01); *G05F 3/262* (2013.01)

(58) Field of Classification Search
CPC ........... G05F 3/242; G05F 3/245; G05F 3/262
See application file for complete search history.

(56) References Cited

U.S. PATENT DOCUMENTS 5,771,165 A * 6/1998 Couture .............. H02M 1/4208 323/338
10,061,340 B1 * 8/2018 Rao ......................... G05F 3/267
(Continued)

FOREIGN PATENT DOCUMENTS

| | | |
|---|---|---|
| KR | 100353289 B1 | 9/2002 |
| TW | 201706749 A | 2/2017 |

OTHER PUBLICATIONS

IPO Combined Search and Examination Report under Sections 17 and 18(3) for GB2106421.7, dated Nov. 8, 2021, 9 pages.
(Continued)

*Primary Examiner* — Jue Zhang
(74) *Attorney, Agent, or Firm* — Klarquist Sparkman, LLP

(57) ABSTRACT

A circuit portion for generating an output reference voltage ($V_{ZERO}$, $V_{UPPER}$, $V_{LOWER}$) includes a self-cascode circuit portion, a follower circuit portion, and a reference resistor ($R_1$). The self-cascode circuit portion generates a first intermediate reference voltage ($V_{REF1}$) at a first node based on an input current ($I_{bias}$) provided thereto. The follower circuit portion mirrors the input current ($I_{bias}$) and generates a second intermediate reference voltage ($V_{REF2}$) at a second node based on the first intermediate reference voltage ($V_{REF1}$). The reference resistor ($R_1$) is coupled to the second node. The follower circuit portion comprises includes a feedback loop that counteracts variations in the second intermediate reference voltage ($V_{REF2}$), and the circuit portion generates the output reference voltage ($V_{ZERO}$, $V_{UPPER}$, $V_{LOWER}$) based on a current through the reference resistor ($R_1$).

19 Claims, 1 Drawing Sheet

(56) References Cited

U.S. PATENT DOCUMENTS

| | | | |
|---|---|---|---|
| 2003/0080720 A1 | 5/2003 | Ghozeil et al. |
| 2005/0218872 A1 | 10/2005 | Wich |
| 2017/0351290 A1 | 12/2017 | Kim |
| 2018/0234084 A1 | 8/2018 | Raychaudhuri |

OTHER PUBLICATIONS

International Search Report and Written Opinion for PCT/EP2022/062197, mailed Sep. 12, 2022, 16 pages.

* cited by examiner

LOW POWER VOLTAGE REFERENCE

CROSS REFERENCE TO RELATED APPLICATIONS

This is the U.S. National Stage of International Application No. PCT/EP2022/062197, filed May 5, 2022, which was published in English under PCT Article 21(2), which in turn claims the benefit of Great Britain Application No. 2106421.7, filed May 5, 2021.

FIELD

The invention relates to circuit portions for generating PVT-stable reference voltages.

BACKGROUND

A reference voltage is typically a fixed voltage that stays substantially constant (i.e. with minimal fluctuations) despite variations in temperature, power supply, load, etc. Many applications require one or more reference voltages in order to operate, a typical example being the use of a reference voltage as a voltage with which to compare other voltages. In such applications, it is important that the reference voltage(s) stay substantially constant, as any changes in a reference voltage may affect the accuracy of any modules that rely on the reference voltages. Analogue to digital converters are a typical example of components which require a substantially constant reference voltage.

In practice, it is almost impossible to generate a constant reference voltage with no fluctuations at all. Temperature, process, supply voltage and load variations, which are typically unavoidable, all cause variations in a design reference voltage. These variations can be minimised through circuit design. Most devices that require a reference voltage are typically able to operate normally if the reference voltage fluctuates within a specified tolerance but it is desirable to keep that variation to a minimum.

In practice, reference voltage generators must balance the ability to generate a substantially constant reference voltage and a number of other factors, including power usage and physical size. In general, circuits are able to compensate for temperature, process, supply voltage and load variations more effectively by utilising physically large components (which typically exhibit fewer variations and can be manufactured to a more accurate standard) and by increasing power usage.

The present invention aims to address at least some of the issues set out above.

SUMMARY OF THE INVENTION

When viewed from a first aspect, the invention provides a circuit portion for generating an output reference voltage, the circuit portion comprising:

- a self-cascode circuit portion arranged to generate a first intermediate reference voltage at a first node based on an input current provided thereto;
- a follower circuit portion arranged to mirror the input current and to generate a second intermediate reference voltage at a second node based on the first intermediate reference voltage; and
- a reference resistor coupled to the second node;

wherein:

- the follower circuit portion comprises a feedback loop arranged to counteract variations in the second intermediate reference voltage; and
- the circuit portion is arranged to generate the output reference voltage based on a current through the reference resistor.

Thus it will be seen that, in accordance with the present invention, the circuit portion is able to copy the first intermediate reference voltage at the first node to the second intermediate reference voltage at the second node, enabled by the follower circuit portion mirroring the current through the self-cascode circuit portion (i.e. the input current). The follower circuit portion may work to maintain the second intermediate reference voltage at a substantially constant level by providing negative feedback thereto via the feedback loop. Specifically, the feedback loop may counteract variations in the second intermediate reference voltage that occur as a result of process, voltage and temperature (PVT) variations in the reference resistor. As a result, the second intermediate reference voltage may be kept substantially stable despite PVT variations, particularly in the reference resistor.

In a set of embodiments, the current through the reference resistor is based on the second intermediate reference voltage. For example, the voltage drop across the reference resistor may be proportional to or equal to the second intermediate reference voltage. Thus, as the second intermediate reference voltage may be kept substantially stable with respect to PVT variations by the feedback loop, the current through the reference resistor may be dependent only on its resistance (which may exhibit substantial PVT variation).

The inclusion of the follower circuit portion may allow the output impedance at the second node to be very low. As a result of this, the second intermediate reference voltage at the second node can be largely independent of the properties (e.g. resistance/impedance, temperature dependency, size, etc.) of the reference resistor despite the variable current through it.

In a set of embodiments, the follower circuit portion is arranged to generate a control voltage at a third node based on the current through the reference resistor. In a set of embodiments, the circuit portion further comprises a voltage converter circuit portion arranged to generate the output reference voltage based on the control voltage. In a set of embodiments therefore, the voltage converter circuit portion is arranged to convert the second intermediate reference voltage to one or more different voltage levels. The inclusion of the voltage converter circuit portion may enable the circuit portion to generate the output reference voltage at any desired level in order to suit the requirements of any circuit portions or components that rely thereon. This increases the flexibility of circuit portions in accordance with the invention and allows them to be used for a number of different applications. In a set of embodiments, the voltage converter circuit portion is arranged to mirror the current through the reference resistor through one or more current branches based on the control voltage. The one or more current branches of the voltage converter circuit portion may comprise one or more resistors, which may be connected in series. The resistors may comprise fixed resistors, variable resistors, potentiometers, trimmable or programmable resistor ladders, etc. In a set of embodiments, each resistor of the voltage converter circuit portion is type-matched to the reference resistor, such that any PVT variations that occur in the reference resistor are tracked in the resistors of the voltage converter circuit portion. As a result, the voltage drop across each resistor of the voltage converter circuit portion may be dependent only on the voltage drop across the reference resistor, and therefore dependent only on the second intermediate reference voltage. In other words, the type-matched resistors may allow cancelling out of PVT variations therein such that the voltage drop across each resistor of the voltage converter circuit portion may be substantially PVT-stable. This may enable the generation of one or more output reference voltages, which may be individually PVT-stable or a difference between them or a pair thereof may be PVT-stable.

In some embodiments, the resistors of the voltage converter circuit portion and the reference resistor each comprise narrow polysilicon (poly) resistors. Narrow poly resistors are typically physically small and exhibit large process and temperature variations. However, by using the same type of resistor throughout, the circuit portion may be able to compensate for any process and temperature variations in resistors included therein, as PVT variations that occur in the reference resistor will be tracked in the resistors of the voltage converter circuit portion.

In a set of embodiments, the input current provided to the self-cascode circuit portion is less than 20 nA, preferably less than 10 nA, more preferably less than 5 nA, e.g. approximately 3.1 nA. Circuit portions in accordance with the invention may therefore be able to generate the output reference voltage without drawing a large amount of power. This is of particular benefit for battery powered devices. It is typical for voltage reference sources with low input current to require the use of physically large resistors with low process and temperature variations in order to compensate for the low input current. However, circuit portions in accordance with the present invention compensate for PVT variations in the resistors included therein, and thus enable the use of physically small resistors. This has the distinct advantage of allowing the circuit portion to be physically compact, thereby enabling the circuit portion to be easily implemented into e.g. a printed circuit board (PCB), an integrated circuit, a system-on-chip (SoC), etc. whilst requiring a minimum of space.

In a set of embodiments, the feedback loop comprises a feedback transistor. A gate terminal of the feedback transistor may be coupled to the third node. A drain terminal of the feedback transistor may be coupled to the second node. A source terminal of the feedback transistor may be coupled to the positive voltage supply rail. The feedback transistor may therefore be arranged such that the current that flows through the reference resistor also flows through the feedback transistor. The gate voltage of the feedback transistor (i.e. the control voltage at the third node), which may be dependent on the current through the feedback transistor, may therefore be dependent on the current through the reference resistor. The feedback transistor may comprise two transistors arranged in a self-cascode configuration. As used herein, the terms 'cascode' and 'cascoding' are used to describe a two-stage amplifier that consists of a common-source stage or transistor feeding in to a common-gate stage or transistor, and the terms 'self-cascode' and 'self-cascoding' are used to described a cascode in which the common-source stage or transistor and the common-gate stage or transistor share the same gate voltage.

Each current branch of the voltage converter circuit portion may comprise a transistor matched to the feedback transistor, and a gate terminal of each of the transistors of the voltage converter circuit portion may be coupled to the third node. The term 'matched' as used herein means that two or more transistors are of the same type (e.g. PMOS or NMOS) and selected to have similar characteristics (e.g. offset voltage, temperature drift, current gain, etc.) such that the current flowing through them for a given set of conditions (voltage, temperature etc.) is substantially the same (e.g. to a greater extent than two nominally identical devices chosen at random). Thus, the transistors of the voltage converter circuit portion may be arranged to mirror the current through the reference resistor by applying the control voltage at the third node (i.e. the gate voltage of the feedback transistor) to their respective gate terminals. Each branch of the voltage converter circuit portion may be tailored to produce one or more reference voltages at desired levels. The voltage converter circuit portion may be coupled to the positive supply voltage rail and the ground rail. Each branch of the voltage converter circuit portion may be individually coupled to the positive supply voltage rail and the ground rail, and thus draw a current that mirrors the current through the reference resistor from the positive supply voltage rail.

In a set of embodiments, the voltage converter circuit portion is further arranged to generate, in addition to the output reference voltage referred to above (hereinafter "the first output reference voltage"), a second output reference voltage and a third output reference voltage. The third output reference voltage may be greater than the first output reference voltage, and the second output reference voltage may be greater than the third output reference voltage. The voltage converter circuit portion may therefore be arranged to generate three different reference voltages, each at a different voltage level.

In some embodiments, the first, second and third output reference voltages are each individually PVT-stable. In some embodiments, each branch of the voltage converter circuit portion comprises an uncompensated transistor. Each uncompensated transistor may be matched to the uncompensated transistors of the other branches of the voltage converter circuit portion, and thus PVT variations in each uncompensated transistor may track each other. As a result of these uncompensated transistors, the first, second and third output reference voltages may not be individually PVT-stable. However, one or more differences between these output reference voltages may be PVT-stable, and thus may be used as PVT-stable floating reference voltages. In a set of embodiments, the first, second and third output reference voltages are generated for use by a peak detector. In a set of embodiments, the difference between the second and first output reference voltages, and the difference between the third and first output reference voltages, are used as PVT-stable floating reference voltages for a peak detector.

In a set of embodiments, the self-cascode circuit portion comprises a cascode transistor and a main transistor, the cascode transistor having a threshold voltage that is smaller than a threshold voltage of the main transistor. It has been found that by having the threshold voltage of the cascode transistor be smaller than the threshold voltage of the main transistor, the first intermediate reference voltage at the first node may maintain substantial PVT-stability. The threshold voltage of the cascode transistor may be substantially lower than typical transistor threshold voltages. For example, the threshold voltage of the cascode transistor may be less than 2000 mV, preferably less than 1000 mV, more preferably less than 500 mV, e.g. approximately 403 mV. The cascode transistor may comprise a device with different physical characteristics to typical transistors—e.g. a doping level—in order to lower the threshold voltage thereof. The threshold voltage of the main transistor may be greater than that of the cascode transistor, but less than 2000 mV, preferably less than 1000 mV, more preferably less than 600 mV, e.g. approximately 517 mV. The cascode and main transistors may be arranged to operate at a sub-threshold level—i.e. with the gate-source voltages thereof being less than the threshold voltages thereof.

The first intermediate reference voltage may exhibit variation of less than 10 mV with respect to temperature variations, preferably less than 5 mV, more preferably less than 2 mV, e.g. approximately 1.5 mV. The first intermediate reference voltage may exhibit variation of less than 20 mV with respect to process variations, preferably less than 10 mV, more preferably less than 7 mV, e.g. approximately 6.5 mV. As the second intermediate reference voltage is based on the first intermediate reference voltage, it is desirable for the first intermediate reference voltage to be substantially PVT-stable so as to reduce variations in the second intermediate reference voltage. This may help improve the PVT-stability of the or each output reference voltage.

In a set of embodiments, a gate terminal of the main transistor is coupled to a gate terminal of the cascode transistor, and the cascode transistor is diode-connected.

As used herein, the term 'diode-connected' is used to describe that a gate terminal of a transistor is coupled to a drain terminal of said transistor. This diode-connected arrangement of the cascode transistor may help increase the PVT-stability of the first intermediate reference voltage. In a set of embodiments, a source terminal of the cascode transistor is coupled to a drain terminal of the main transistor at the first node. By coupling the cascode and main transistors in this manner, the cascode and main transistors share the same gate voltage, and thus form a self-cascode arrangement. Thus, it will be seen that the gate terminal of the main transistor is also coupled to the drain terminal of the cascode transistor. This self-cascode arrangement may help increase the PVT-stability of the first intermediate reference voltage.

In a set of embodiments, the follower circuit portion comprises a super source follower circuit portion. In a set of embodiments, the follower circuit portion comprises a first mirror transistor matched to the cascode transistor and a second mirror transistor matched to the main transistor, wherein a gate terminal of the first mirror transistor is coupled to a gate terminal of the second mirror transistor and to a gate terminal of the cascode transistor. The first mirror transistor may therefore have a threshold voltage that is smaller than a threshold voltage of the second mirror transistor. As the first and second mirror transistors are matched to the cascode and main transistors respectively, the current through the cascode and main transistors (i.e. the self-cascode circuit portion) may be substantially accurately mirrored through the first and second mirror transistors.

The follower circuit portion may be coupled to a positive voltage supply rail and to a ground rail. The follower circuit portion may be arranged to draw a current that is substantially equal to the current through the self-cascode circuit portion from the positive voltage supply rail. The follower circuit portion may be coupled to the positive voltage supply rail via a first supply transistor.

In a set of embodiments, the first mirror transistor is coupled to a drain terminal of the second mirror transistor at the second node. This arrangement may mirror the arrangement of the cascode and main transistors in the self-cascode circuit portion, and thus the second intermediate reference voltage at the second node may be dependent on the first intermediate reference voltage at the first node. In a set of embodiments, a gate terminal of the feedback transistor is coupled to a drain terminal of the first mirror transistor at the third node. A drain terminal of the feedback transistor may be coupled to a source terminal of the first mirror transistor at the second node.

In a set of embodiments, the circuit portion further comprises a current mirror circuit portion configured to mirror the current through the self-cascode circuit portion. The current mirror circuit portion may be coupled to the follower circuit portion such that the follower circuit portion mirrors the current through the current mirror circuit portion. As a result, the follower portion may be forced to mirror the current through the self-cascode circuit portion and the current mirror circuit portion. This may prevent the current through the first supply transistor of the follower circuit portion from varying, particularly as a result of PVT variations in the reference resistor, thus enabling the feedback loop to counteract variations in the second intermediate reference voltage. The feedback loop and current mirror circuit portion may prevent PVT variations in the reference resistor from affecting a gate-source voltage of the first mirror transistor, and therefore prevent PVT variations in the reference resistor from affecting the second intermediate reference voltage.

In a set of embodiments, the current mirror circuit portion comprises a third mirror transistor matched to the cascode transistor and a fourth mirror transistor matched to the main transistor; wherein a gate terminal of the third mirror transistor is coupled to a gate terminal of the fourth mirror transistor and to a gate terminal of the cascode transistor.

The current mirror circuit portion may be coupled to the positive voltage supply rail, and to the ground rail. The current mirror circuit portion may be arranged to draw a current that is substantially equal to the current through the self-cascode circuit portion from the positive voltage supply rail. The current mirror circuit portion may be coupled to the positive voltage supply rail via a second supply transistor. The first and second supply transistors may comprise P-type metal-oxide-semiconductor field-effect transistors (MOSFETs), and may have source degeneration resistors coupled thereto. The first and second supply transistors may each comprise two transistors arranged in a self-cascode configuration. The first supply transistor may be matched to the second supply transistor. A gate terminal of the first supply transistor may be coupled to a gate terminal of the second supply transistor. This arrangement may force the first supply transistor to conduct a current equal to the current through the second supply transistor.

In a set of embodiments, each of the transistors described herein comprises a metal-oxide-semiconductor field-effect transistor (MOSFET). The cascode and mirror transistors may comprise N-type MOSFETs, and the feedback transistor may comprise a P-type MOSFET. In other embodiments, the transistors discussed herein may comprise any other type of transistor. In some embodiments, one or more of the transistors discussed herein are provided with source degeneration resistors. In particular, one or more P-type MOSFETs included in the circuit portion may be provided with source degeneration resistors. The term 'source degeneration resistor' as used herein is used to describe a resistor connected in series to a source terminal of a transistor.

The terms "circuit", "circuitry" and "circuit portion" as used herein may refer to open circuits or to closed circuits; i.e. they encompass circuit portions that may form part of a closed circuit when connected to other elements such as a power supply.

Features of any aspect or embodiment described herein may, wherever appropriate, be applied to any other aspect or embodiment described herein.

Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION OF THE DRAWINGS

Figure 1:
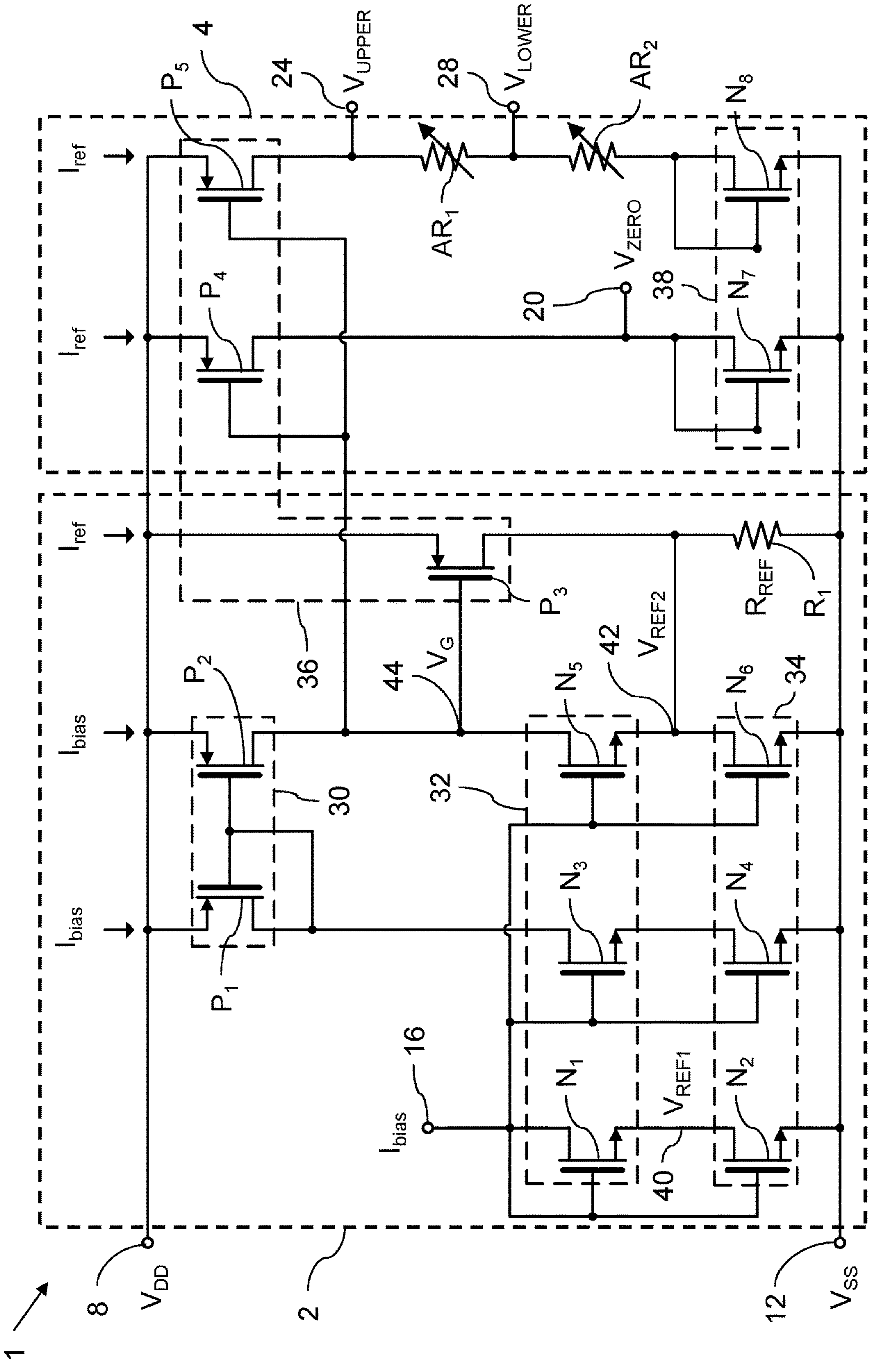
FIG. 1 is a circuit diagram of a peak detector reference voltage generator comprising a reference voltage generation circuit portion according to an embodiment of the invention.

FIG. 1 shows a diagram of a circuit portion 1 for generating a reference voltage according to an embodiment of the invention, the circuit portion 1 comprising a reference voltage generator circuit portion 2 and a voltage converter circuit portion 4. The reference voltage generator 2 generates a substantially constant intermediate reference voltage $V_{REF2}$ that is easy to replicate and stable with respect to process, voltage and temperature (PVT) variations. The voltage converter 4 converts the intermediate reference voltage $V_{REF2}$ generated by the reference voltage generator 2 into one or more reference voltages. In this example, the voltage converter 4 converts the intermediate reference voltage $V_{REF2}$ generated by the reference voltage generator 2 into three different reference voltages for use by a peak detector, though it will be appreciated that voltage converter 4 is not limited as such. The reference voltage generator 2 is coupled to the voltage converter 4.

The reference voltage generator 2 is coupled to a positive voltage supply rail $V_{DD}$ 8, a ground rail $V_{SS}$ 12, and a current source (not shown) which produces an input or bias current $I_{bias}$ provided to a bias current input 16. In this example, the positive voltage supply rail $V_{DD}$ 8 provides a positive supply voltage to the reference voltage generator 2 and to the voltage converter 4, and the ground rail $V_{SS}$ 12 provides a ground connection to the reference voltage generator 2 and to the voltage converter 4. It will appreciated that in some examples the ground rail $V_{SS}$ 12 may instead provide a negative supply voltage rather than a ground connection. The input current $I_{bias}$ in one example is equal to 3.1 nA but is not limited as such—the input current $I_{bias}$ may have any appropriate value.

The reference voltage generator 2 comprises three P-type metal-oxide-semiconductor (PMOS) field-effect transistors (FET) $P_1$, $P_2$ & $P_3$, six N-type metal-oxide-semiconductor (NMOS) field-effect transistors (FET) $N_1$, $N_2$, $N_3$, $N_4$, $N_5$ & $N_6$, and a reference resistor $R_1$. The transistors described herein are not limited to PMOS and NMOS transistors as shown in this example, but may comprise any appropriate type of transistor. In this example the reference resistor $R_1$ has a resistance equal to $R_{REF}$, which may be any appropriate value.

The voltage converter 4 is coupled to the positive voltage supply rail 6 via the supply voltage input 8, the negative voltage supply or ground rail 10 via the supply voltage input 12, and to a node 44. The voltage converter 4 comprises two PMOS transistors $P_4$ & $P_5$, two NMOS transistors $N_7$ & $N_8$, and two adjustable/variable resistors $AR_1$ & $AR_2$. The voltage converter provides a first output reference voltage terminal 20, a second output reference voltage terminal 24 and a third output reference voltage terminal 28, and is configured to output a first output reference voltage $V_{ZERO}$, a second output reference voltage $V_{UPPER}$ and a third output reference voltage $V_{LOWER}$ via these three output terminals respectively. In this example, the two adjustable resistors $AR_1$ & $AR_2$ comprise trimmable or programmable resistor ladders, though it will be appreciated that the two adjustable resistors $AR_1$ & $AR_2$ are not limited as such, but may comprise any appropriate resistance elements, including but not limited to: fixed resistors, potentiometers, thermistors, variable resistors, light dependent resistors, rheostats, trimmer potentiometers, etc.

The first and second PMOS transistors $P_1$ & $P_2$ of the reference voltage generator 2 are matched, together forming a first matched transistor group 30; the first, third and fifth NMOS transistors $N_1$, $N_3$ & $N_5$ of the reference voltage generator 2 are matched, together forming a second matched transistor group 32; the second, fourth and sixth NMOS transistors $N_2$, $N_4$ & $N_5$ of the reference voltage generator 2 are matched, together forming a third matched transistor group 34; the third PMOS transistor $P_3$ of the reference voltage generator 2 and the first and second PMOS transistors $P_4$ & $P_5$ of the voltage converter 4 are matched, together forming a fourth matched transistor group 36; and the first and second NMOS transistors $N_7$ & $N_8$ of the voltage converter 4 are matched, together forming a fifth matched transistor group 38.

Each of the first, third and fifth NMOS transistors $N_1$, $N_3$ & $N_5$ of the reference voltage generator 2 are selected to have a very low threshold voltage $V_t$—approximately 403 mV in this particular example. In this example, each of the first, third and fifth NMOS transistors $N_1$, $N_3$ & $N_5$ of the reference voltage generator 2 comprise medium oxide super-low $V_t$ N-type MOSFETs (herein abbreviated to EGSLVTNFET). The term "medium oxide" is used herein to describe a device with a medium thickness gate oxide (i.e. a higher thickness than a typical transistor gate oxide) in order to be able to handle higher gate voltages.

Each of the second, fourth and sixth NMOS transistors $N_2$, $N_4$ & $N_5$ of the reference voltage generator 2 are also selected to have a low threshold voltage $V_t$ but one that is larger than that of the first, third and fifth NMOS transistors $N_1$, $N_3$ & $N_5$—approximately 517 mV in this particular example. In this example, each of the second, fourth and sixth NMOS transistors $N_2$, $N_4$ & $N_5$ of the reference voltage generator 2 comprise medium oxide low $V_t$ N-type MOSFETs (herein abbreviated to EGLVTNFET).

Source degeneration resistors are provided for (and coupled to) each of the five PMOS transistors $P_1$, $P_2$, $P_3$, $P_4$ & $P_5$, but these source degeneration resistors are not shown in FIG. 1 for the sake of simplicity. It will therefore be appreciated that when a source terminal of one of the five PMOS transistors $P_1$, $P_2$, $P_3$, $P_4$ or $P_5$ is described as being coupled to another component, input, output or rail in this example, it is coupled via a source degeneration resistor. Furthermore, each of the PMOS transistors $P_1$, $P_2$, $P_3$, $P_4$ & $P_5$ may be self-cascoded. This means that each of the PMOS transistors $P_1$, $P_2$, $P_3$, $P_4$ & $P_5$ may comprise two individual PMOS transistors with the drain terminal of one of transistor coupled to the source terminal of the other transistor, and the gate terminals of both transistors coupled such that they share the same gate voltage. The possible self-cascode arrangement of the PMOS transistors $P_1$, $P_2$, $P_3$, $P_4$ & $P_5$ is not shown in FIG. 1 for the sake of simplicity, as each self-cascode PMOS arrangement can be treated as a single PMOS transistor.

The connections between the various components of the circuit portion 1 will now be described in detail, starting with the connections between the components of the reference voltage generator 2. The drain terminal of the first NMOS transistor $N_1$ is coupled to the current source input 16, thereby providing it with the input current $I_{bias}$. This transistor $N_1$ is diode-connected and therefore the gate terminal thereof is coupled to the drain terminal thereof, thereby also coupling the gate terminal to the current source input 16. The source terminal of the transistor $N_1$ is coupled to the drain terminal of the second NMOS transistor $N_2$ at a node 40, and the gate terminal of the second NMOS transistor $N_2$ is coupled to the gate terminal of the first NMOS transistor $N_1$. The source terminal of the second NMOS transistor $N_2$ is then coupled to the ground rail $V_{SS}$ 12.

The first and second NMOS transistors $N_1$ & $N_2$ of the reference voltage generator 2 are arranged as shown in FIG. 1 and described above in order to form a self-cascode diode connection $N_{1-2}$. As used herein, the terms 'cascode' and 'cascoding' are used to describe a two-stage amplifier that consists of a common-source stage feeding in to a common-gate stage, which may be referred as the 'main' transistor and the 'cascode' transistor respectively in a two-transistor cascode like the first and second NMOS transistors $N_1$ & $N_2$. In this example, the common-source stage (the main transistor) is the second NMOS transistor $N_2$ and the common-gate stage (the cascode transistor) is the first NMOS transistor $N_1$. As used herein, the terms 'self-cascode' and 'self-cascoding' are used to described a cascode as described above but where the common-source stage/main transistor (the second NMOS transistor $N_2$ in this example) and the common-gate stage/cascode transistor (the first NMOS transistor $N_1$ in this example) share the same gate voltage.

The gate terminal of the third NMOS transistor $N_3$ is coupled to the gate and drain terminals of the first NMOS transistor $N_1$, and also therefore to the current source input 16. The gate terminal of the third NMOS transistor $N_3$ is then coupled to the gate terminal of the fourth NMOS transistor $N_4$. Similarly, the gate terminal of the fifth NMOS transistor $N_5$ is coupled to the gate and drain terminals of the first NMOS transistor $N_1$, and also therefore to the current source input 16. The gate terminal of the fifth NMOS transistor $N_5$ is coupled to the gate terminal of the sixth NMOS transistor $N_6$.

The source terminal of the first PMOS transistor $P_1$ is coupled to the positive voltage supply rail $V_{DD}$ 8. Similarly, the source terminal of the second PMOS transistor $P_2$ is coupled to the positive voltage supply rail $V_{DD}$ 8. As described previously, the first and second PMOS transistors $P_1$ & $P_2$ are provided with source degeneration resistors which are not shown in FIG. 1. The gate terminal of the first PMOS transistor $P_1$ is coupled to the gate terminal of the second PMOS transistor $P_2$. The gate terminals of the first and second PMOS transistors $P_1$ and $P_2$ are then coupled to the drain terminal of the first PMOS transistor $P_1$.

The drain terminal of the first PMOS transistor $P_1$ is coupled to the drain terminal of the third NMOS transistor $N_3$. The source terminal of the third NMOS transistor $N_3$ is then coupled to the drain terminal of the fourth NMOS transistor $N_4$. The source terminal of the fourth NMOS transistor $N_4$ is coupled to the ground rail $V_{SS}$ 12. Similarly, the drain terminal of the second PMOS transistor $P_2$ is coupled to the drain terminal of the fifth NMOS transistor $N_5$ of the reference voltage generator 2 at a node 44. The source terminal of the fifth NMOS transistor $N_5$ is then coupled to the drain terminal of the sixth NMOS transistor $N_6$ at a node 42. The nodes 40, 42 & 44 are referred to hereinafter as the first node 40, the second node 42 and the third node 44. The source terminal of the sixth NMOS transistor $N_6$ is coupled to the ground rail $V_{SS}$ 12.

The source terminal of the third PMOS transistor $P_3$ is coupled to the positive voltage supply rail $V_{DD}$ 8 via a source degeneration resistor (not shown) as described previously. The drain terminal of the third PMOS transistor $P_3$ is coupled to the source and drain terminals of the fifth and sixth NMOS transistors $N_5$ & $N_6$ respectively at the second node 42. The gate terminal of the third PMOS transistor $P_3$ is coupled to the drain terminals of the second PMOS transistor $P_2$ and the fifth NMOS transistor $N_5$ at the third node 44. A first terminal of the reference resistor $R_1$ (which has a resistance equal to $R_{REF}$ as described previously) is coupled to the source terminal of the fifth NMOS transistor $N_5$ and to the drain terminals of the third PMOS transistor $P_3$ and the sixth NMOS transistor $N_6$ at the second node 42. The second terminal of the reference resistor $R_1$ is coupled to the ground rail $V_{SS}$ 12.

Now turning to the connections of the voltage converter 4, this is coupled to the reference voltage generator 2 at the third node 44. The gate terminals of the first and second PMOS transistors $P_4$ & $P_5$ of the voltage converter 4 are coupled to the gate terminal of the third PMOS transistor $P_3$ of the reference voltage generator 2 and the drain terminals of the second PMOS transistor $P_2$ and the fifth NMOS transistor $N_5$ of the reference voltage generator 2 at the third node 44. The gate terminals of the first and second PMOS transistors $P_4$ & $P_5$ of the voltage converter 4 are therefore also coupled to each other. The source terminals of the first and second PMOS transistors $P_4$ & $P_5$ of the voltage converter 4 are coupled to the positive voltage supply rail $V_{DD}$ 8 via their respective source degeneration resistors (not shown).

The drain terminal of the first PMOS transistor $P_4$ of the voltage converter 4 is coupled to the first output reference voltage terminal 20 providing the first output reference voltage $V_{ZERO}$. The drain terminal of the first PMOS transistor $P_4$ of the voltage converter 4 is also coupled to the gate and drain terminals of the first NMOS transistor $N_7$ of the voltage converter 4, which is therefore diode-connected. The source terminal of the first NMOS transistor $N_7$ of the voltage converter 4 is coupled to the ground rail $V_{SS}$ 12.

The drain terminal of the second PMOS transistor $P_5$ of the voltage converter 4 is coupled to the second output reference voltage terminal 24 providing the second output reference voltage $V_{UPPER}$. The drain terminal of the second PMOS transistor $P_5$ of the voltage converter 4 is also coupled to a first terminal of the first adjustable resistor $AR_1$. The second terminal of the first adjustable resistor $AR_1$ is coupled to the third output reference voltage terminal 28 which provides the third output reference voltage $V_{LOWER}$, as well as to a first terminal of the second adjustable resistor $AR_2$. The second terminal of the second adjustable resistor $AR_2$ is coupled to the gate and drain terminals of the second NMOS transistor $N_8$ of the voltage converter 4 which is therefore diode-connected. The source terminal of the second NMOS transistor $N_8$ of the voltage converter 4 is coupled to the ground rail $V_{SS}$ 12.

Operation of the circuit portion 1 will now be described in more detail. In overview, the reference voltage generator 2 provides a PVT-stable intermediate reference voltage $V_{REF2}$ at the second node 42 to the reference resistor $R_1$, thereby causing the resistor $R_1$ to conduct a current equal to $V_{REF2}/R_{REF}$, i.e. one which is dependent only on the resistance $R_{REF}$ of the reference resistor $R_1$. Whilst this may exhibit substantial PVT variation, e.g. of the order of tens of percent, the voltage converter 4 copies the current through the reference resistor $R_1$ to the first and second PMOS transistors $P_4$ & $P_5$ of the voltage converter 4, which in turn supply the current to their respective branches. By using the same type of resistors as the reference resistor $R_1$ in the voltage converter 4, any PVT variations that occur in the reference resistor $R_1$ are tracked in the resistors $AR_1$ & $AR_2$ of the voltage converter 4.

By supplying the current through the reference resistor $R_1$ to the branches of the voltage converter 4, controlled by the control voltage $V_G$ at the third node 44, the voltage drops across the resistors $AR_1$ & $AR_2$ of the voltage converter 4 are kept substantially PVT-stable, mirroring the PVT-stability of the second intermediate reference voltage $V_{REF2}$. The branches of the voltage converter 4 are then used generate the first, second and third PVT-stable output reference voltages $V_{ZERO}$, $V_{UPPER}$ and $V_{LOWER}$ respectively which may be used as reference voltages for a peak detector (not shown).

Considering the operation in greater detail, the input current $I_{bias}$ flows through the self-cascode diode connection $N_{1-2}$. As a result, a first intermediate reference voltage $V_{REF1}$ is generated at the first node 40. It has been found that by using an extra-low threshold voltage transistor as the cascode transistor (the first NMOS transistor $N_1$ of the reference voltage generator 2 in this example), good PVT stability for the first intermediate reference voltage $V_{REF1}$ can be achieved through correct sizing of the first and second NMOS transistors $N_1$ & $N_2$ of the reference voltage generator 2. For example, it has been found that the first intermediate reference voltage $V_{REF1}$ may be PVT stable within a range of 6.5 mV. In this example, the gate-source voltages $V_{gs}$ of the first and second NMOS transistors $N_1$ & $N_2$ are smaller than the threshold voltages $V_t$ thereof, meaning that the first and second NMOS transistors $N_1$ & $N_2$ operate at a sub-threshold level. In this example, the gate-source voltage $V_{gs}$ of the first NMOS transistor $N_1$ is approximately 228 mV (compared with its approximate threshold voltage $V_t$ of 403 mV), and the gate-source voltage $V_{gs}$ of the second NMOS transistor $N_2$ is approximately 385 mV (compared with its approximate threshold voltage $V_t$ of 517 mV).

While the first intermediate reference voltage $V_{REF1}$ at the first node 40 is PVT-stable, it needs to be copied and scaled in order to provide a more useful reference voltage. The third, fourth, fifth and sixth NMOS transistors $N_3$, $N_4$, $N_5$, $N_6$ and the first and second PMOS transistors $P_1$ & $P_2$ are included in the voltage reference generator 2 in order to perform this functionality. The third and fourth NMOS transistors $N_3$ & $N_4$ act a self-cascode current mirror by copying the gate voltage of the self-cascode diode connection $N_{1-2}$, causing the third and fourth NMOS transistors $N_3$ & $N_4$ to conduct a current equal to $I_{bias}$. This is enabled in part due to the matching of the first, third and fifth NMOS transistors $N_1$, $N_3$ & $N_5$ and the second, fourth and sixth NMOS transistors $N_2$, $N_4$ & $N_5$ of the reference voltage generator 2. The mirrored current equal to $I_{bias}$ is drawn from the positive voltage supply rail $V_{DD}$ 8 through the first PMOS transistor $P_1$ which is diode connected and therefore also conducts a current equal to $I_{bias}$.

Similarly, the fifth and sixth NMOS transistors $N_5$ & $N_6$ of the reference voltage generator 2 act as a self-cascode current mirror by copying the gate voltage of the self-cascode diode connection $N_{1-2}$, causing these transistors $N_5$ & $N_6$ to conduct a current equal to $I_{bias}$. This mirrored current is drawn from the positive voltage supply rail $V_{DD}$ 8 through the second PMOS transistor $P_2$. As the gate terminals of the first and second PMOS transistors $P_1$ & $P_2$ are coupled, the current flowing through the first PMOS transistor $P_1$ (which is diode-connected) is mirrored by the second PMOS transistor $P_2$. This forces the second PMOS transistor $P_2$ to conduct a current equal to $I_{bias}$, regardless of the load connected thereto or drain voltage of the transistor $P_2$ (i.e. the control voltage $V_G$ at the third node 44), and therefore substantially increases the impedance at the third node 44. In this example, the fifth and sixth NMOS transistors $N_5$ & $N_6$ of the reference voltage generator 2 act as the first and second mirror transistors and the third and fourth NMOS transistors $N_3$ & $N_4$ of the reference voltage generator 2 act as the third and fourth mirror transistors.

A second intermediate reference voltage $V_{REF2}$ is therefore generated at the second node 42 that mirrors the first intermediate reference voltage $V_{REF1}$ at the first node 40 and therefore maintains substantial PVT-stability. The third PMOS transistor $P_3$ is included in the reference voltage generator 2 order to form a follower circuit portion in combination with the fifth and sixth NMOS transistors $N_5$ & $N_6$, with the second intermediate reference voltage $V_{REF2}$ at its output. More specifically, the arrangement of these transistors $P_3$, $N_5$ & $N_6$ forms a super source follower circuit portion, in which a feedback loop is formed by the third PMOS transistor $P_3$ and the fifth NMOS transistor $N_5$ between the second node 42 and the third node 44. The source terminal of the fifth NMOS transistor $N_5$ can be considered to be the sensing input of the feedback loop, with this transistor $N_5$ amplifying the sensed signal and outputting it at the third node 44. The third PMOS transistor $P_3$ can be considered to be the second (common source) stage of the feedback loop. In this example, the third PMOS transistor $P_3$ of the reference voltage generator 2 acts as a feedback transistor of the follower circuit portion.

The feedback loop formed by the third PMOS transistor $P_3$ and the fifth NMOS transistor $N_5$ provides negative feedback to the second intermediate reference voltage $V_{REF2}$ at the second node 42 in order to counteract variations therein and thus maintain it at a substantially constant level despite PVT variations, particularly PVT variations in the reference resistor $R_1$. The way in which the feedback loop provides this negative feedback is explained in the following example. Consider a situation in which the circuit portion 1 is at a stable operating point, before the resistance $R_{REF}$ of the reference resistor $R_1$ decreases as a result of PVT variations. This causes the reference resistor $R_1$ to draw an increased current, as dictated by Ohm's law. At first, the reference resistor $R_1$ attempts to draw the increased current from the source terminal of the fifth NMOS transistor $N_5$. As this transistor $N_5$ is in common-drain configuration (i.e. it acts as a source follower), this causes its gate-source voltage to increase, thereby causing it to attempt to draw an increased current from the second PMOS transistor $P_2$. The second PMOS transistor $P_2$, however, is forced to conduct a current equal to $I_{bias}$ by the current mirror formed by the transistors $P_1$, $N_3$ and $N_4$, as its gate terminal is coupled to the gate terminal of the first PMOS transistor $P_1$.

The second PMOS transistor $P_2$ is therefore prevented from supplying any additional current to the fifth NMOS transistor $N_5$. This causes a sharp drop in the drain voltage of the fifth NMOS transistor $N_5$ (and therefore the control voltage $V_G$ at the third node 44), thereby causing $P_3$ to supply additional current to the reference resistor $R_1$. Thus, the reference resistor $R_1$ is provided with the additional current it draws by the third PMOS transistor $P_3$, and no additional current is provided to the reference resistor $R_1$ by the fifth NMOS transistor $N_5$. This transistor $N_5$ therefore continues to conduct a current equal to $I_{bias}$, resulting in its gate-source voltage (and therefore the second intermediate reference voltage $V_{REF2}$ at the second node) being kept substantially constant by the feedback loop, despite the initial PVT variations that caused the initial decrease in the resistance $R_{REF}$ of the reference resistor $R_1$. Thus, the feedback loop serves to counteract variations in the load on the second node 42 (i.e. the reference resistor $R_1$) so as to maintain the second intermediate reference voltage $V_{REF2}$ at the second node 42 at a substantially constant level (i.e. the feedback loop provides negative feedback to the second intermediate reference voltage $V_{REF2}$). As the impedance at the third node 44 is high (due to the first PMOS transistor $P_1$ forcing the second PMOS transistor $P_2$ to conduct a current equal to $I_{bias}$), the feedback loop provides this negative feedback with high gain. The feedback loop therefore prevents PVT variations in the reference resistor $R_1$ affecting the gate-source voltage of the fifth NMOS transistor $N_5$, and therefore the second intermediate reference voltage $V_{REF2}$.

In other words, the feedback loop lowers the output impedance (i.e. at the second node 42) of the super source follower formed by the third PMOS transistor $P_3$ and the fifth and sixth NMOS transistors $N_5$ & $N_6$ of the reference voltage generator 2. This enables the second intermediate reference voltage $V_{REF2}$ to remain substantially constant despite variations in the load of the second node 42—i.e. the resistance $R_{REF}$ of the reference resistor $R_1$. This means that the reference resistor $R_1$ does not need to be physically large, nor does it need to be manufactured to have an accurate and temperature-stable resistance. This means that the reference resistor $R_1$ may comprise a narrow polysilicon or poly resistor which typically exhibit large process and temperature variations.

The second intermediate reference voltage $V_{REF2}$ (which is substantially constant) at the second node 42 is then supplied to the reference resistor $R_1$. The resistor $R_1$, which has a resistance equal to $R_{REF}$, therefore conducts a current $I_{ref}$ equal to $(V_{REF2}-V_{SS})/R_{REF}$. In this example, as the ground rail $V_{SS}$ 12 provides a connection to ground (i.e. $V_{SS}$=0V), the current $I_{ref}$ is therefore equal to $V_{REF2}/R_{REF}$. The resistance $R_{REF}$ of the reference resistor may exhibit substantial PVT variations, but these do not affect the second intermediate reference voltage $V_{REF2}$ at the second node as a result of the feedback loop. Instead, these PVT variations modify the current $I_{REF}$ drawn by the reference resistor $R_1$ through the transistor $P_3$, and therefore also the control voltage $V_G$ at the third node 44.

The current $I_{ref}$ through the third PMOS transistor $P_3$, which is equal to that through the reference resistor $R_1$, is copied to the first and second PMOS transistors $P_4$ & $P_5$ of the voltage converter 4 as their gate terminals are coupled to the third node 44. This means that the third PMOS transistor $P_3$ of the reference voltage generator 2 and the first and second PMOS transistors $P_4$ & $P_5$ of the voltage converter 4 share the same gate voltage. As a result, the current through the first and second PMOS transistors $P_4$ & $P_5$ of the voltage converter 4 is equal to $I_{ref}$—the same as that through the reference resistor $R_1$.

The current flowing through the first and second adjustable resistors $AR_1$ & $AR_2$ is therefore equal to the current $I_{ref}$ flowing through the second PMOS transistor $P_5$ of the voltage converter 4. The first adjustable resistor $AR_1$ introduces a first variable voltage drop across its two terminals, and the second adjustable resistor $AR_2$ introduces a second variable voltage drop across its two terminals. The second output reference voltage $V_{UPPER}$ is therefore at a higher level than the third output reference voltage $V_{LOWER}$, with the difference between the second and third output reference voltages $V_{UPPER}$ & $V_{LOWER}$ being equal to the voltage drop across the first adjustable resistor $AR_1$. PVT variations in the adjustable resistors $AR_1$ & $AR_2$ track those that occur in the reference resistor $R_1$. As a result, by supplying the current $I_{REF}$ to the adjustable resistors $AR_1$ & $AR_2$, the voltage drop across each remains substantially PVT-stable, mirroring the PVT-stability of the voltage drop across the reference resistor $R_1$, which is in turn proportional or equal to the PVT-stable second intermediate reference voltage $V_{REF2}$ at the second node 42. The first output reference voltage $V_{ZERO}$ is at a lower level than both the second output reference voltage $V_{UPPER}$ and the third output reference voltage $V_{LOWER}$.

A current equal to $I_{ref}$ therefore also flows through the first and second NMOS transistors $N_7$ & $N_8$ of the voltage converter 4, which act as uncompensated transistors of the voltage converter circuit portion 4. The voltage drops across these diode-connected transistors $N_7$ & $N_8$ may vary as a result of PVT variations, which may in turn affect the voltage levels of the first, second and third output reference voltages $V_{ZERO}$, $V_{UPPER}$ & $V_{LOWER}$. As a result, each of these output reference voltages $V_{ZERO}$, $V_{UPPER}$ & $V_{LOWER}$ may not be individually PVT-stable. However, the first and second NMOS transistors $N_7$ & $N_8$ are matched, and therefore any PVT variations that occur in one of these transistors are tracked in the other transistor.

As a result of this, the difference between the second and first output reference voltages $V_{UPPER}-V_{ZERO}$ and the difference between the third and first output reference voltages $V_{LOWER}-V_{ZERO}$ remain PVT-stable despite the output reference voltages $V_{ZERO}$, $V_{UPPER}$ & $V_{LOWER}$ individually exhibiting PVT-variation. These reference voltage differences $V_{UPPER}-V_{ZERO}$ and $V_{LOWER}-V_{ZERO}$ may therefore be used as PVT-stable floating voltage references. In this particular example, these two floating voltage references $V_{UPPER}-V_{ZERO}$ and $V_{LOWER}-V_{ZERO}$ are used as PVT-stable floating voltage references for a peak detector (not shown).

In some examples, the branches of the voltage converter 4 may not include any uncompensated transistors like the first and second NMOS transistors $N_7$ & $N_8$, and instead include only resistors in addition to the first and second PMOS transistors $P_4$ & $P_5$. In such examples, the output reference voltages $V_{ZERO}$, $V_{UPPER}$ & $V_{LOWER}$ may be individually PVT-stable, as the voltage converter 4 contains only devices for which the control voltage $V_G$ at the third node 44 compensates for PVT variations by being dependent on the current $I_{REF}$ through the reference resistor $R_1$.

In this example, the first output reference voltage $V_{ZERO}$ at the first output reference voltage terminal 20 receives a large amount of kickback from other components connected to the circuit portion 1 (not shown). Because of this, two current branches are utilised in the voltage converter 4 in this particular example. This helps alleviate the issues associated with the large amount of kickback that the first output reference voltage $V_{ZERO}$ receives.

It will be appreciated by those skilled in the art that the invention has been illustrated by describing one or more specific embodiments thereof, but is not limited to these embodiments; many variations and modifications are possible within the scope of the appended claims.

The invention claimed is:

1. A circuit portion for generating an output reference voltage, the circuit portion comprising:

a self-cascode circuit portion arranged to generate a first intermediate reference voltage at a first node based on an input current provided thereto;

a follower circuit portion arranged to mirror the input current and to generate a second intermediate reference voltage at a second node based on the first intermediate reference voltage; and a reference resistor coupled to the second node;

wherein:

the follower circuit portion comprises a feedback loop arranged to counteract variations in the second intermediate reference voltage; and the circuit portion is arranged to generate the output reference voltage based on a current through the reference resistor, wherein the self-cascode circuit portion comprises a cascode transistor and a main transistor, and the gate terminal of the main transistor is coupled to the gate terminal of the cascode transistor.

2. The circuit portion as claimed in claim 1, wherein the feedback loop is arranged to provide negative feedback to the second intermediate reference voltage.

3. The circuit portion as claimed in claim 1, wherein the feedback loop is arranged to counteract variations in the second intermediate reference voltage that occur as a result of process, voltage and temperature variations in the reference resistor.

4. The circuit portion as claimed in claim 1, wherein the follower circuit portion is arranged to generate a control voltage at a third node based on the current through the reference resistor.

5. The circuit portion as claimed in any claim 4, wherein:

the feedback loop comprises a feedback transistor;

a gate terminal of the feedback transistor is coupled to the third node; and a drain terminal of the feedback transistor is coupled to the second node.

6. The circuit portion as claimed in claim 4, further comprising a voltage converter circuit portion arranged to mirror the current through the reference resistor through one or more current branches comprising one or more resistors connected in series, based on the control voltage, in order to generate the output reference voltage.

7. The circuit portion as claimed in claim 6, wherein each resistor of the voltage converter circuit portion is type-matched to the reference resistor such that any PVT variations that occur in the reference resistor are tracked in the resistors of the voltage converter circuit portion.

8. The circuit portion as claimed in claim 6, wherein each current branch of the voltage converter circuit portion comprises a transistor matched to the feedback transistor, and wherein a gate terminal of each transistor of the voltage converter circuit portion is coupled to the third node such that a current through each transistor of the voltage converter circuit portion is based on the current through the reference resistor.

9. The circuit portion as claimed in claim 6, wherein the voltage converter circuit portion is further arranged to generate, in addition to the output reference voltage, a second output reference voltage and a third output reference voltage, each at a different voltage level.

10. The circuit portion as claimed in claim 9, wherein one or more differences between the first, second and third output reference voltages are used as floating reference voltages for a peak detector.

11. The circuit portion as claimed in claim 1, wherein the cascode transistor has a threshold voltage that is smaller than a threshold voltage of the main transistor.

12. The circuit portion as claimed in claim 11, further comprising a current mirror circuit portion configured to mirror a current through the self-cascode circuit portion and coupled to the follower circuit portion such that the follower circuit portion mirrors the current through the current mirror circuit portion.

13. The circuit portion as claimed in claim 12, wherein the current mirror circuit portion comprises a third mirror transistor matched to the cascode transistor and a fourth mirror transistor matched to the main transistor, wherein a gate terminal of the third mirror transistor is coupled to a gate terminal of the fourth mirror transistor and to a gate terminal of the cascode transistor.

14. The circuit portion as claimed in claim 12, wherein:

the follower circuit portion is coupled to a positive voltage supply rail via a first supply transistor;

the current mirror circuit portion is coupled to the positive voltage supply rail via a second supply transistor;

the first supply transistor is matched to the second supply transistor; and a gate terminal of the first supply transistor is coupled to a gate terminal of the second supply transistor such that a current through the first supply transistor mirrors a current through the second supply transistor.

15. The circuit portion as claimed in claim 14, wherein the current mirror circuit portion is arranged to prevent a current through the first supply transistor from varying as a result of process, temperature and voltage variations in the reference resistor.

16. The circuit portion as claimed in claim 1, arranged such that the cascode and main transistors operate at a sub-threshold level.

17. The circuit portion as claimed in claim 1, wherein the cascode transistor is diode-connected, and a source terminal of the cascode transistor is coupled to a drain terminal of the main transistor at the first node.

18. The circuit portion as claimed in claim 1, wherein:

the follower circuit portion comprises a first mirror transistor matched to the cascode transistor and a second mirror transistor matched to the main transistor;

a gate terminal of the first mirror transistor is coupled to a gate terminal of the second mirror transistor and to a gate terminal of the cascode transistor; and the first mirror transistor is coupled to a drain terminal of the second mirror transistor at the second node.

19. The circuit portion as claimed in claim 18, wherein:

the follower circuit portion is arranged to generate a control voltage at a third node based on the current through the reference resistor;

the feedback loop comprises a feedback transistor;

a gate terminal of the feedback transistor is coupled to a drain terminal of the first mirror transistor at the third node; and a drain terminal of the feedback transistor is coupled to a source terminal of the first mirror transistor at the second node.

* * * * *